United States Patent [19]

Kloots

[11] 4,073,050
[45] Feb. 14, 1978

[54] METHOD OF MAKING FIBEROPTIC CABLE ASSEMBLY

[75] Inventor: Jacobus Kloots, Sturbridge, Mass.

[73] Assignee: Applied Fiberoptics, Inc., Southbridge, Mass.

[21] Appl. No.: 719,342

[22] Filed: Aug. 31, 1976

[51] Int. Cl.² ............................................. B23P 11/02
[52] U.S. Cl. ......................................... 29/450; 29/458; 29/460; 264/263; 350/96.23
[58] Field of Search ............... 29/458, 460, 450, 445; 350/96 B, 96 C; 264/263

[56] References Cited

U.S. PATENT DOCUMENTS

| 2,716,623 | 8/1955 | Tator | 264/263 |
|---|---|---|---|
| 3,285,242 | 11/1966 | Wallace | 350/96 B UX |
| 3,287,485 | 11/1966 | McCord | 264/263 |
| 3,396,994 | 8/1968 | Tsunehiko Ito et al. | 29/450 X |
| 3,455,625 | 7/1969 | Brumley et al. | 350/96 C |
| 3,507,949 | 4/1970 | Campbell | 350/96 C UX |
| 3,903,615 | 9/1975 | Datsko | 350/96 C X |
| 3,910,678 | 10/1975 | McCartney et al. | 350/96 C |
| 4,027,938 | 6/1977 | Lewis | 350/96 C |

*Primary Examiner*—Charlie T. Moon
*Attorney, Agent, or Firm*—Thomas N. Tarrant

[57] ABSTRACT

A fiberoptic cable assembly in which an extruded sheath for the bundle of optical fibers has latex or silicone rubber end casings for handling and strain relief that are molded directly to the cable sheath.

4 Claims, 2 Drawing Figures

METHOD OF MAKING FIBEROPTIC CABLE ASSEMBLY

BACKGROUND OF THE INVENTION

1. Field of the Invention

The present invention relates to fiberoptic cables and particularly to such cables having pluggable end fittings and reinforcing casings adjacent the end fittings for handling purposes.

2. Description of the Prior Art

Fiberoptic cables commonly have a latex or silicone rubber sheath and end assemblies including a tubular elastomeric strain reliever, a rigid plastic or metal casing and an end fitting. The strain reliever is either cemented to the sheath or holds to the sheath by elastic tension; the casing commonly secures to both sheath and strain reliever enclosing the end of the strain reliever; and, the end fitting is commonly a plug or receptacle that secures to the casing. Separation of parts in the end assemblies has been a problem and the assembly itself expensive.

SUMMARY OF THE INVENTION

Now, in accordance with the present invention, a fiberoptic cable and method of assembly is provided of reduced cost and greater reliability. This is accomplished with a rigid insert fitted into the end of the latex or silicone rubber cable sheath after which a combined strain reliever and end casing of latex or silicone rubber is molded to the cable sheath simultaneously adhering to an exposed portion of the insert. The desired end fitting secures to the insert as, for example, by screw threads.

DESCRIPTION OF THE PREFERRED EMBODIMENT

Figure 1:
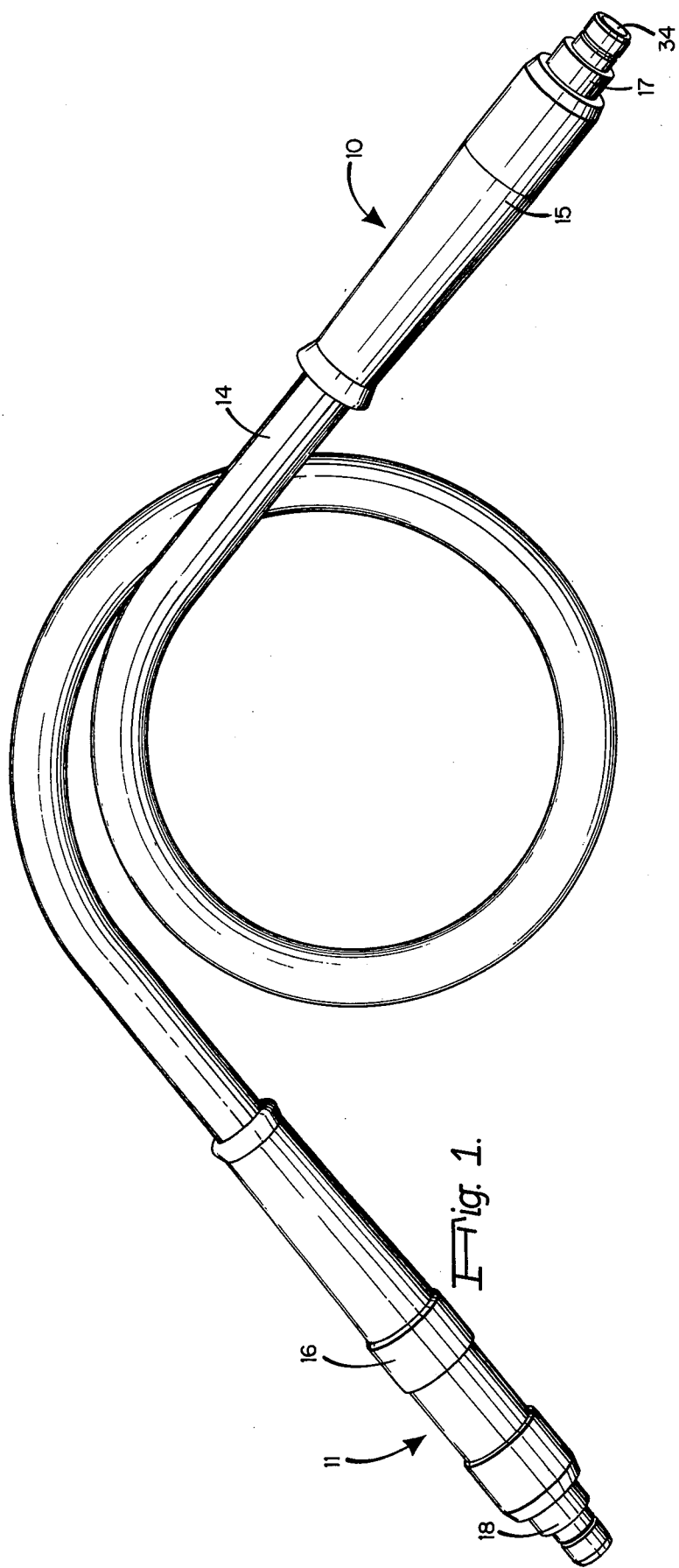
FIG. 1 is a perspective view of a fiberoptic cable according to the invention.

A usual fiberoptic cable is one that plugs into equipment at each end so that it is readily removed for replacement, storage, cleaning or the like. Such a cable, as depicted in FIG. 1, has a relatively light terminal assembly 10 at one end for connecting, for example, to a light source at which end it will normally have minimal handling during use. Second end 11 has a substantially heavier terminal assembly whereby it may be connected to an optical device and then readily used for handling the optical device without putting excessive strain on the fragile optical fibers within the cable.

Figure 2:
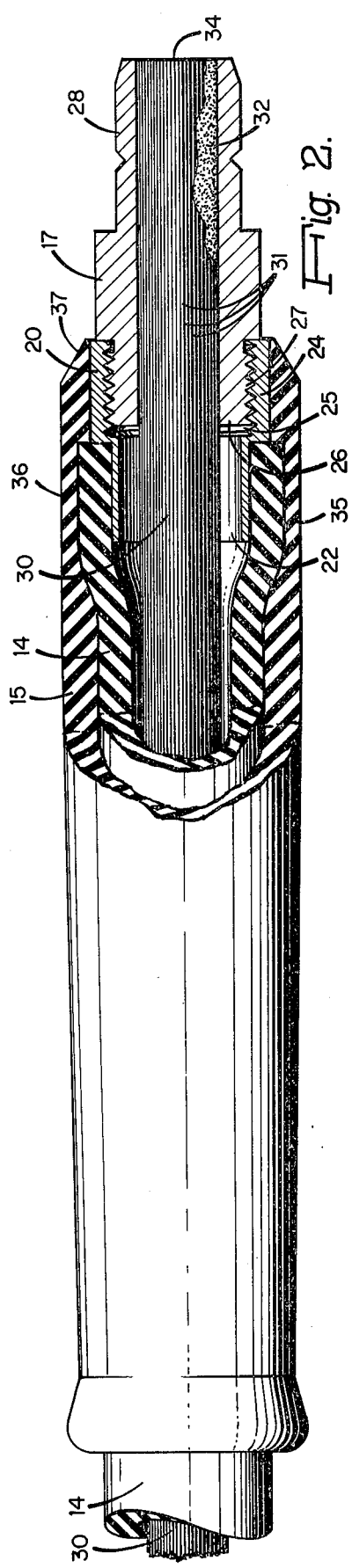
FIG. 2 is a cross-sectional view of an end assembly taken along 2—2 of FIG. 1.

The cable assembly of FIG. 1 has a core of optical fibers (see FIG. 2) covered by a sheath 14 of latex or silicone rubber. Both end assemblies 10 and 11 are provided with additional casings 15 and 16 respectively also of latex or silicone rubber molded in place over sheath 14. Terminal fittings 17 and 18, fitted to end assemblies 10 and 11 respectively, are secured within the terminal assemblies and act as plug-in connectors for connecting purposes. The internal details of end assemblies 10 are depicted in a cross-sectional view of FIG. 2. While these cables are made in various sizes, exemplary dimensions for a specific size are given for purposes of disclosing relative dimensions within the assembly. Thus, sheath 14 is a tube of latex or silicone rubber having a natural interior dimension of 0.25 inches (0.635 centimeters), and a wall thickness of 0.093 inches 0.23 centimeter). Insert 20 is depicted as a cylindrical metal insert that is stepped along its axis from a first outer diameter of 0.344 inches (0.873 centimeters) at small end 22 to a second outside diameter approximately equal to the outside diameter of tubing 14 at large end 24. Thus for tubing with an outside diameter of 0.436 inches (1.107 centimeters), the outside diameter of big end 24 will likewise be approximately 0.436 inches (1.107 centimeters). Generally, small end 22 will have an outside diameter in the approximate range of 0.0625 inches (0.159 centimeters) to 0.125 inches (0.3175 centimeters) larger than the inside diameter of tubing 14. The length of small end 22 along the axis of insert 20 is preferably at least 0.250 inches (0.635 centimeters) so that it may be readily inserted and held secure by tubing 14 during assembly. The length of big end 24 along the axis is preferably also at least 0.250 inches (0.635 centimeters) in order to provide adequate exterior surface for adherence to casing 15. The inside diameters of insert 20 are not critical but are desirably somewhat larger than the inside diameter of tubing 14 so that end fitting 17 may be installed in insert 20 without unduly restricting the aperture. The inside of big end 24 carries a screw thread 25 for receiving end fitting 17.

In manufacture insert 20 is inserted with its small end 22 inside tubing 14 and then the end of tubing 14 along with insert 20 are placed in a mold. Casing 15 of latex or silicone rubber is molded about tubing 14 and insert 20 inside the mold. Either heat or solvent may be used with the latex material of casing 15 in the mold to allow forming of casing 15 around tubing 14 and insert 20 while at the same time producing a strong bond between casing 15, tubing 14 and insert 20. This bond is by fusion or interface blending of the two rubber materials and by cementing effect of the liquified latex or silicone rubber as it hardens about insert 20.

End fitting 17 may be any of a number of fittings adapted to connect to different types of optical apparatus or light sources having a first end 26 with an exterior screw thread 27. End 26 with screw thread 27 mates with screw thread 25 of insert 20. Opposite end 28 of fitting 17 is adapted for connection to the exterior equipment.

In the process of assembling the fiberoptic cable, one preferred sequence of assembly, after insert 20 has been installed and casing 15 molded about the cable end, is to then install core 30 consisting of a bundle of optical fibers 31 extending beyond both ends of the cable. Terminal assembly 10 is assembled by fitting end fitting 17 over core 30 and screwing it into insert 20. Since end fitting 17 will never be removed once installed, it is preferable to add some type of an adhesive to the screw threads upon installation. A bonding material 32, which may be an epoxy resin or other material normally used to cement optical fibers together, is next forced into end 28 of fitting 17 to fill all interstices between fibers 31 as well as providing a cement between core 30 and the interior surface of end 28. After bonding material 32 has completely hardened, fibers 31 projecting beyond end 28 are sheared off and fibers 31 together with bonding material 32 are then polished down to an optical finish flush with terminal surface 34 of end fitting 17. Terminal assembly 11 is assembled in the same fashion as terminal assembly 10.

Casings 15 and 16 are suitably in the range of two to five inches long. The length is selected for strain relief purposes and handling convenience and is not critical to the invention. The molding of casings 15 and 16 desirably produce a wall thickness in the casing that tapers from a maximum thickness of approximately 0.100 inches (0.254 centimeters) to a minimum thickness of approximately 0.050 inches (0.127 centimeters). The taper in thickness is from a point proximate to end 22 of insert 20 to the end of casing 15 around tubing 14. Over section 35 of casing 15 where it encloses insert 20, the outside surface 36 of casing 15 stays at a relatively constant diameter with the wall thickness varying to accommodate the shape of tubing 14 and insert 20. End 37 of casing 15 may have a small taper or chamfer if desired.

While the invention has been described with respect to a specific embodiment, obvious variations are contemplated. For example, while fitting 17 has been described as secured to insert 20 by screw threads, other types of interlocking arrangements may be used; and while the optical fibers have been described as polished flush with the end of fitting 17 for special connection purposes, it is sometimes desirable to have the polished ends recessed or projecting. Thus it is intended to cover the invention within the scope of the following claims.

I claim:

1. A method of assembling fiberoptic cables comprising:
   a. cutting a length of extruded elastomer tubing;
   b. fitting into one end of said tubing an insert while leaving a portion of said insert exposed;
   c. placing said end into a mold and molding an end casing of elastomer around said tubing extending over and adhering to said insert;
   d. installing a bundle of optical fibers in said tubing projecting at said one end;
   e. securing a cylindrical end fitting into said insert;
   f. cutting said fibers at said one end;
   g. filling the interstices between said fibers and space between said fibers and said end fitting with cement; and,
   h. polishing said fibers flush with said end fitting at said one end.

2. A method of assembling fiberoptic cables according to claim 1 wherein said insert has interior screw threads, said cylindrical end fitting has exterior screw threads at one end and said securing comprises screwing said cylindrical end fitting into said insert.

3. A method of assembling fiberoptic cables according to claim 1 wherein said molding comprises heating whereby said end casing fuses to said tubing.

4. A method of assembling fiberoptic cables according to claim 1 wherein said insert has an exterior diameter larger than the interior diameter of said tubing and said tubing is stretched in order to fit said insert therein.

* * * * *